United States Patent [19]

Krude

[11] 4,359,128
[45] Nov. 16, 1982

[54] WHEEL HUB BEARING ARRANGEMENT

[75] Inventor: Werner Krude, Neunkirchen, Fed. Rep. of Germany

[73] Assignee: Uni-Cardan Aktiengesellschaft, Siegburg, Fed. Rep. of Germany

[21] Appl. No.: 112,195

[22] Filed: Jan. 15, 1980

[30] Foreign Application Priority Data

Jan. 29, 1979 [DE] Fed. Rep. of Germany ....... 2903229

[51] Int. Cl.³ ............................................. B60K 17/30
[52] U.S. Cl. ................................. 180/258; 180/70 R; 464/145; 464/906 R
[58] Field of Search .................. 180/70 R, 73 D, 254, 180/256, 257, 258, 259; 64/4, 21, 30 R, 30 E, 30 A; 308/16, 173, 9 R; 403/56, 122

[56] References Cited

U.S. PATENT DOCUMENTS 2,855,062 10/1958 Arentzen ............................ 64/30 R
3,782,841 1/1974 Winckelhaus ...................... 64/30 R
4,090,751 5/1978 Krude .................................... 64/21
4,300,651 11/1981 Krude ................................ 180/256

Primary Examiner—Joseph F. Peters, Jr.
Assistant Examiner—Ross Weaver
Attorney, Agent, or Firm—Toren, McGeady & Stanger

[57] ABSTRACT

In a bearing arrangement of a wheel hub driven by a constant velocity universal joint, a vehicle wheel is bolted to the wheel hub. The outer joint member of the universal joint at its outer end has a double frusto-conical surface diverging first outwardly and then inwardly in the inward direction of the wheel. A complementary frusto-conical surface is provided on an inner bearing ring fixed to the wheel hub and bears against the inner part of the double frusto-conical surface. Another complementary frusto-conical surface is provided on an intermediate flange of a brake disc positioned between the wheel hub and vehicle wheel. This frusto-conical surface bears against the outer part of the double frusto-conical surface.

2 Claims, 1 Drawing Figure

WHEEL HUB BEARING ARRANGEMENT

SUMMARY OF THE INVENTION

The present invention is directed to a bearing arrangement for a wheel hub driven by a constant velocity universal joint and, in particular, it is directed to mating surfaces on an outer joint member of the universal joint, on an inner bearing ring fixed to the wheel hub and an intermediate flange located on a brake disc bolted between the wheel hub and the vehicle wheel.

In a known bearing arrangement of this general type, as disclosed in German Offenlegungsschrift No. 2 329 554, the vehicle wheel is fastened directly to the wheel hub by wheel bolts so that torque is transmitted continuously from the drive unit to the vehicle wheel through the drive shaft and the constant velocity universal joint in the wheel. In this arrangement, there is no protection against bolts which are insufficiently fastened in the vehicle wheel, accordingly, accidents may easily occur when the vehicle wheel and its wheel bolts are incorrectly mounted.

Therefore, it is the primary object of the present invention to provide a bearing construction of the above mentioned type so that when vehicle wheels are incorrectly mounted and the wheel bolts insufficiently fastened the transmission of torque from the drive shaft to the vehicle wheels is interrupted, however, the braking effect on the wheels is maintained.

In accordance with the invention, when the wheel bolts are properly secured, the torque is transmitted from the universal joint to the vehicle wheels by the complementary shaped frusto-conical surfaces formed on the outer end surface of the outer joint member and on the inner bearing ring fixed to the wheel hub and on the intermediate flange secured between the vehicle wheel and the wheel hub.

With this arrangement any incorrect mounting is recognized immediately due to the lack of proper frictional connection between the wheel hub, the intermediate flange on the brake disc, and the outer joint member. The starting torque of a vehicle is usually very high and must be introduced into the vehicle wheel through the drive shaft. When such torque transmission is interrupted because of improperly secured wheel bolts, the vehicle cannot move although the drive shaft rotates and the differential gear system is operative. Since the vehicle cannot move or be driven, the driver realizes that the vehicle wheels are incorrectly mounted.

When the wheel bolts are fastened correctly, the frictional force in the connection increases to such an extent that the torque transmission between the drive shaft and the wheel is maintained even under unfavorable conditions. Moreover, in the event of an improper start, where an excessively high rate of rotation is transmitted or when the operator's foot slips off the clutch pedal, it is possible, by fastening the wheel bolts to a predetermined force, to reduce peak torques whereby the entire drive unit can be reduced in weight.

To afford an advantageous production of the bearing arrangement, based on an essential feature, the outer annular surface on the outer end of the outer joint member is formed as a double frusto-conical surface with the abutting surfaces of the inner bearing ring and the intermediate flange of the brake disc each having a complementary shaped frusto-conical surface. In accordance with the present invention, the production of such frusto-conical surfaces can be easily obtained.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a sectional view through a portion of a vehicle wheel showing a wheel bearing, a constant velocity universal joint, and a brake disc for the wheel.

DETAIL DESCRIPTION OF THE INVENTION

Figure 1:
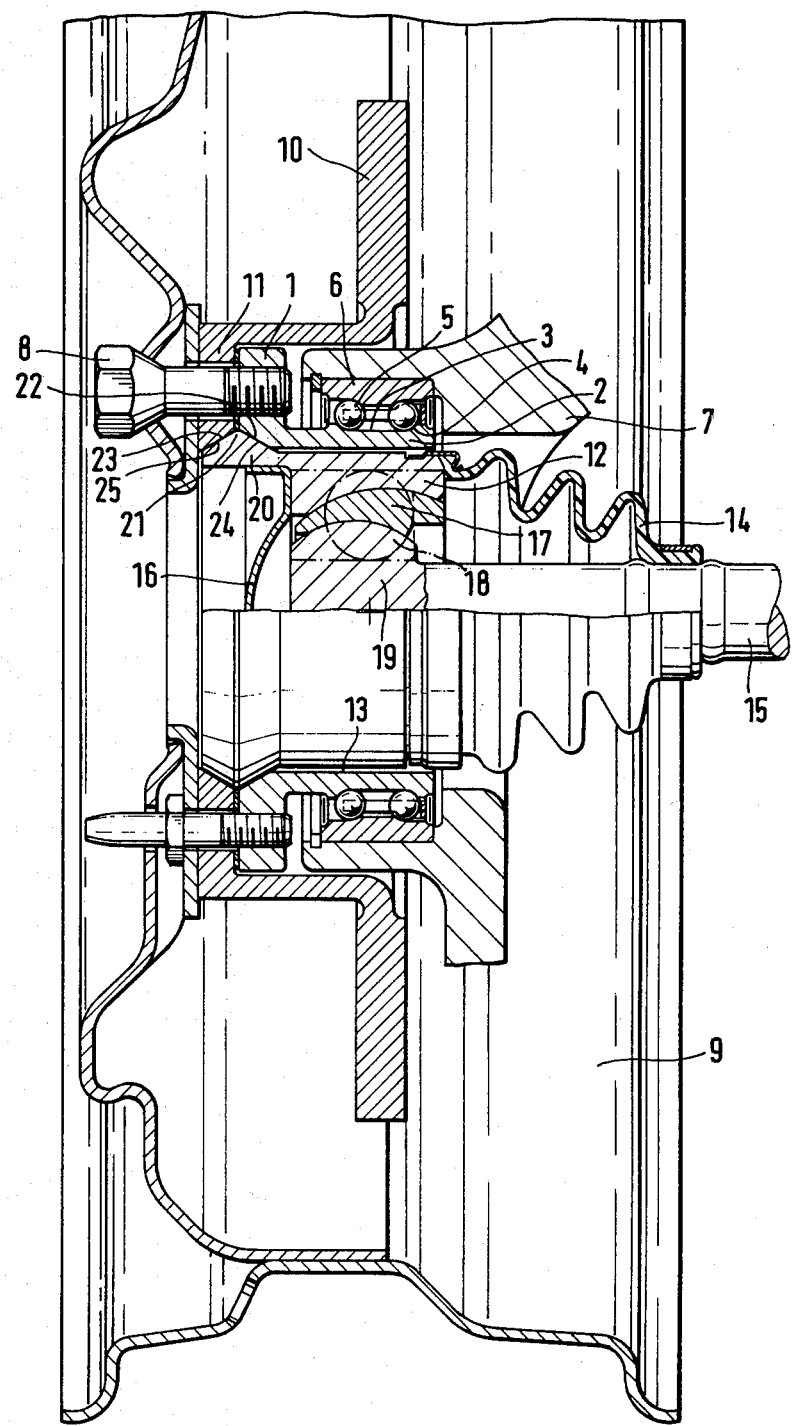

In FIG. 1 a wheel bearing for a motor vehicle wheel is illustrated. The wheel bearing includes a flange-like wheel hub 1 formed as a single unit with an axially extending inner bearing ring 2. The bearing ring extends in the axial direction of the vehicle wheel. As viewed in FIG. 1 the upper portion of the wheel hub is shown in section and the radially outer surface 3 of the inner bearing ring 2 contains grooves 4 in which rolling body 5 are positioned. The wheel bearing includes the inner bearing ring 2, the rolling bodies 5 and an outer bearing ring 6 laterally encircling the inner bearing ring. By means of a flange 7, the outer bearing ring is fastened on a wheel support, not shown. The wheel hub 1 is provided with bolt holes extending in the axial direction of the wheel. Wheel bolts 8 extend into the bolt holes and secure the vehicle wheel 9 and the brake disc 10 on the wheel hub. Brake disc 10 has an intermediate flange 11 positioned between the outer end of the wheel hub 1 and the wheel itself.

The constant velocity universal joint includes an outer joint member positioned within a bore 13 formed within the inner bearing ring 2. The interior space of the joint is sealed, on one hand, by a bellows 14 fixed to the outer surface of the outer joint member 2 and on the intermediate shaft 15. On the other hand, a cover 16 closes the outer end of the joint with the cover being pressed into a bore formed in the outer end of the outer joint member 12.

The outer joint member 12 is hollow and has a spherical interior space in which a cage 17 serves to guide balls 18, shown in phantom. In addition, the inner surface of the cage is guided on the outer surface of inner joint member 19.

On its outer end, that is the left-hand end as viewed in FIG. 1, outer joint member 12 has an annular extension 20 which forms the bore into which the cover 16 is pressed. The radially outer surface of extension 20 is defined by a double frusto-conical surface made up of the surfaces 22 and 23. Starting with the inner end of the extension 20 the frusto-conical surface 22 diverges outwardly for part of the axial length of the extension and at its largest diameter the other frusto-conical surface 23 then converges inwardly to the outer end of the extension. Accordingly, the surfaces 22 and 23 form a double frusto-conical surface with the maximum diameter of the surface being located between the ends of the extension 20. The outer end of the inner bearing ring 2 from which the hub extends has an annular frusto-conical surface 24 complementary to the inner frusto-conical surface 22 on the extension 20. In addition, the radially inner edge of the intermediate flange 11 has an annular shaped frusto-conical surface 25 formed complementary to the outer frusto-conical surface 23 on the extension 20 of the outer joint member 12. Accordingly, through the intermediate flange, the brake disc 10 cooperates with the extension on the outer joint member.

Each wheel bolt 8 extends into a threaded bore in the wheel hub 1 while the opening through the flange 11 merely provides guidance for the bolt. The double frusto-conical surfaces 22, 23 on the extension 20 of the outer joint member 12 effects a frictional engagement with the complementary frustoconical surfaces 24, 25 on the inner bearing ring 2 and the intermediate flange 11 when the wheel bolts are properly fastened. If the wheel bolts 8 are properly secured, the frictional engagement between these surfaces ensures the torque transmission from the intermediate shaft 15 through the constant velocity universal joint to the vehicle wheels 9. If, however, the wheel bolts are improperly fastened, the transmission of torque is interrupted at the frictional connection, with the result that the transmission of force becomes impossible. Even if there is no transmission of torque, however, the effect of the brake disc 10 on the wheel is maintained.

While specific embodiments of the invention have been shown and described in detail to illustrate the application of the inventive principles, it will be understood that the invention may be embodied otherwise without departing from such principles.

What is claimed is:

1. Bearing arrangement comprising an annular wheel hub, a constant velocity universal joint mounted in said wheel hub for driving said wheel hub, said constant velocity universal joint comprising a hollow outer joint member and an inner joint member positioned within said outer joint member and a joint shaft extending inwardly from said inner joint member, said wheel hub comprising an annular flange extending transversely of the axis of the universal joint and an inner bearing ring extending in the axial direction of the universal joint and extending inwardly from the radially inner side of said wheel hub, said inner bearing ring forming an axially extending bore with said outer joint member positioned within said bore so that said outer joint member and inner bearing ring rotate together, said wheel hub having wheel holes extending therethrough in the direction of the axis of said inner bearing ring, a brake disc having an intermediate flange positioned in juxtaposed relation to and outwardly from said wheel hub, said intermediate flange having holes therethrough in alignment with the holes in said wheel hub, wheel bolts arranged to extend through a vehicle wheel and through the holes in said intermediate flange and the wheel holes in said wheel hub into threaded engagement with said wheel hub for fixing the vehicle wheel and said brake disc to said wheel hub so that the wheel, said brake disc and wheel hub rotate together, said outer joint member having an outer circumferential surface facing toward the inner surface of said inner bearing ring, the bore in said inner bearing ring being dimensioned so that said outer joint member with the remainder of said constant velocity universal joint including the joint shaft can be inserted into said inner bearing ring from the outer end thereof from which said wheel hub extends tranversely, wherein the improvement comprises that said outer joint member has an annular extension on the end thereof extending outwardly from said wheel hub, said extension having an annular outer surface with said annular outer surface comprising a first axially extending frusto-conical surface diverging outwardly from the outer end thereof and a second axially extending frusto-conical surface having a maximum diameter similar to the maximum diameter of said first frusto-conical surface and diverging inwardly in the inward direction of the universal joint, the inner surface of said inner bearing ring at the end thereof from which said wheel hub extends transversely having a frusto-conical surface converging inwardly from the end of said inner bearing ring in the inward direction of the universal joint and being complementary to and in surface contact with said second frusto-conical surface of said extension, and said intermediate flange on said brake disc located outwardly of the end of said inner bearing ring and laterally encircling said extension, said intermediate flange having an annular frusto-conical surface formed complementary to and disposed in surface contact with said first frusto-conical surface on said extension so that the frusto-conical surface on said intermediate flange is in diverging relation in the direction toward said inner bearing ring.

2. Bearing arrangement set forth in claim 1, wherein said first frusto-conical surface and said second frusto-conical surface form a double frusto-conical surface with the maximum diameters of each frusto-conical surface being located in the same transverse plane.

* * * * *